United States Patent [19]

Fearnhead

[11] 4,237,015
[45] Dec. 2, 1980

[54] FILTER UNITS

[75] Inventor: Robert Fearnhead, Worsley, England

[73] Assignee: Automotive Products Limited, Leamington Spa, England

[21] Appl. No.: 34,991

[22] Filed: May 1, 1979

[30] Foreign Application Priority Data

May 6, 1978 [GB] United Kingdom ............... 18112/78

[51] Int. Cl.³ .............................................. B01D 27/08
[52] U.S. Cl. ............................. 210/444; 210/DIG. 17
[58] Field of Search ............................... 210/441–444, 210/DIG. 17

[56] References Cited

U.S. PATENT DOCUMENTS

| | | | |
|---|---|---|---|
| 2,584,551 | 2/1952 | Chambers et al. | 210/442 |
| 2,586,508 | 2/1952 | Brotman | 210/444 X |
| 3,307,705 | 3/1967 | Halmenschlager | 210/443 |
| 3,589,517 | 6/1971 | Palmai | 210/443 X |

*Primary Examiner*—William A. Cuchlinski, Jr.
*Attorney, Agent, or Firm*—Kemon & Estabrook

[57] ABSTRACT

This invention relates to fluid filter units comprising a canister having a filter element permanently retained in the canister by an end plate. The end plate is attached to the canister by a closing ring which is joined to the end plate and which forms a seam joint with the mouth of the canister. An annular seal is provided at the junction of fluid leakage paths past the end plate to the inner and outer peripheries of the closing ring so that the seal closes both leakage paths.

Such filter units are particularly suitable for the lubrication systems of internal combustion engines.

1 Claim, 3 Drawing Figures

FILTER UNITS

This invention relates to fluid filter units for, but not exclusively for, the lubrication systems of motor vehicle internal combustion engines.

A filter unit typically comprises a canister, a filter element housed within the canister; an end plate permanently retaining the element in the canister and providing means for detachably mounting the filter element into a fluid flow path; and a closing ring having a joint with the end plate and having outer peripheral portions forming a seam joint with the canister at the mouth thereof so as to secure the end plate to the canister. Such a filter unit will be described as a filter unit of the kind defined.

A filter unit of the kind referred is typically used in the lubrication systems of automobile engines, and is generally a disposable unit known in the trade as a "Cartridge Filter".

A major disadvantage of this type of filter construction is that because the end plate is not sealed against the canister wall but is merely held in position by the closing ring, oil can seep past the end plate and in order for the unit to be oil tight the seam joint between closing ring and canister must be oil tight and the joint between the closing ring and the end plate must be oil tight.

In order to make sure that these joints are oil tight it is usual to coat the mouth of the canister with a seam dope prior to rolling the seam, and to run an oil resistant adhesive seal around the inner periphery of the closing ring to seal between the ring and the end plate.

The present invention obviates the need for applying the seam dope and the adhesive.

According to the present invention there is provided a filter unit of the type defined in which an annular seal is provided at the junction of fluid paths past the end plate to the inner and outer peripheries of the ring so that the seal acts simultaneously to close both potential leakage paths.

As well as obviating the need for applying seam dope and an adhesive seal as previously described, the invention gives rise to other significant advantages. Because the seam joint and the joint between the closing ring and end plate are no longer required to be fluid tight the manufacturing tolerances during the assembly of filter units can be increased, and also, the seam need not be rolled so tightly and this reduces wear on the seaming tools. Further during rolling of the seam the resilient seal will tend to absorb some of the impact of the seaming tools hitting the metal canister during the forming of the seam joint.

An embodiment of the invention will be described with reference to the accompanying drawing in which:

FIG. 1 shows an oil filter unit the general construction and workings of which are well known and will only be described briefly for a sufficient understanding of the present invention.

Figure 1:
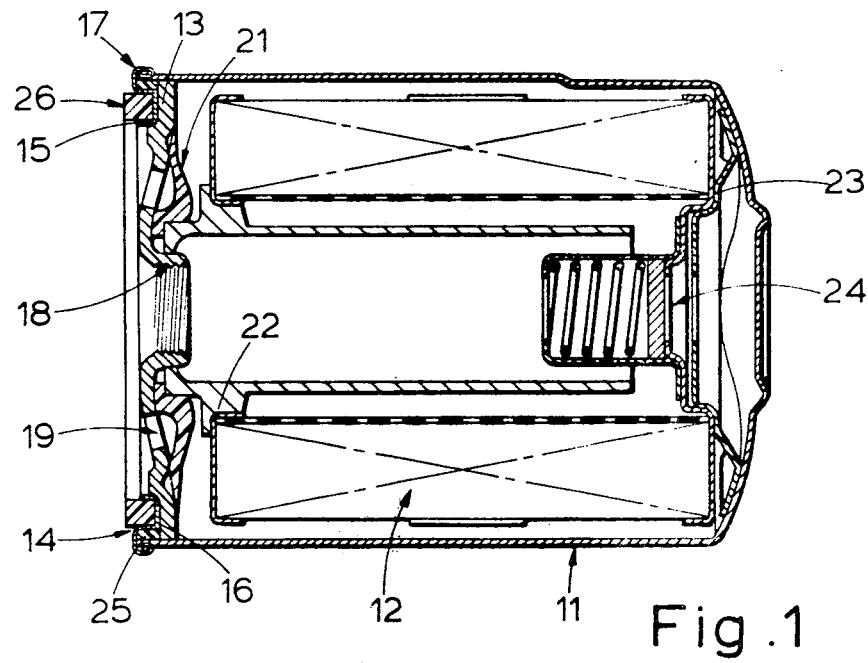
FIG. 1 is a longitudinal section through an oil filter unit according to this invention.

The oil filter unit comprises a canister 11 housing a filter element 12 which is permanently retained in the canister 11 by an end plate 13 which closes the mouth 14 thereof. The end plate 13 carries a closing ring 15 on its outer peripheral portions. The closing ring 15 has an annular rectangular cross-sectioned groove 16 housing a seal 26 at its inner peripheral portions and is secured to the mouth 14 of the canister 11 by its outer peripheral portions 27 forming a seam joint 17 with the mouth 14 of the canister 11. The closing ring 15 is secured to the end plate 13 by circumferentially distributed spot-welds which weld the base of the groove 16 to the end plate 13.

The end plate 13 has a central screw threaded aperture 18 for detachably mounting the filter unit into the oil flow path of an internal combustion engine and through which oil exits the filter unit. The aperture 18 is surrounded by eight equiangularly spaced holes 19 through which oil enters the filter unit. An anti-drain valve 21 is trapped between the inner surface of the end plate 13 and a filter element support 22 and prevents oil from draining back out of the filter unit when the engine is idle.

The end of the element 12 away from the end plate 13 is also held on a support 23 fixed to the inside of the cannister 11 such that the supports 22 and 23 hold the element 12 in position inside the canister. A pressure relief valve 24 is incorporated in the end of the element adjacent the support 23 so as to allow the oil to by-pass the filter element in the event of it being clogged.

Figure 2:
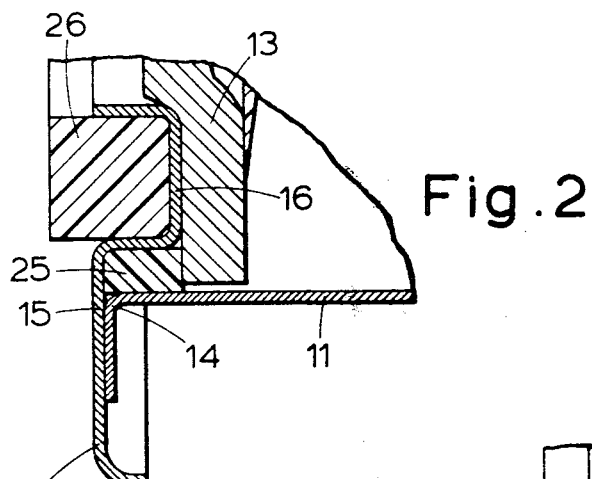
FIG. 2 is an enlarged section showing the seam joint prior to seaming.

An elastomeric annular seal 25 is trapped between the radially outer periphery of the end plate 13, the closing ring 15 and the inside surface of the mouth of the canister. As can be seen from FIG. 2 a slight gap exists between some portions of the edge of the end plate 13 and the inner surface of the mouth of the canister, this gap being caused by fluctuations in production tolerances between the size of the end plate and the canister. The annular seal 25 is fitted in position prior to assembly between end plate 13 and the outer peripheral portions 27 of the closing ring secured thereto and fits against the radially outer side wall of the groove 16. When the end plate 13 is pushed into the mouth 14 of the canister 11 as in FIG. 2 the seal 25 then acts against the inner surface of the canister.

Figure 3:
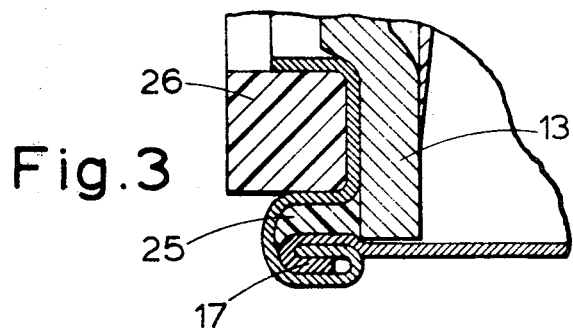
FIG. 3 is an enlarged section showing the seam joint after seaming.

After the rolling over of the outer portion 27 of the ring 15 with the mouth 14 of the canister to form the seam joint 17, as in FIG. 3, the annular seal 25 has been compressed and distorted so as to form a resiliently loaded seal acting between the end plate 13, ring 15, and canister 11 to prevent oil seepage from around the edge of the end plate 13 and thus prevent leakage through the formed seam joint 17 and at the same time also prevent leakage through the joint formed between the base of the groove 16 and the end plate 13.

I claim:

1. A fluid filter unit comprising:

a canister;

a filter element housed within the canister;

an end plate located in the mouth of the canister for permanently retaining the element in the canister and providing means for detachably mounting the filter element into a fluid flow path;

a closing ring means joined to the end plate and having outer peripheral portions forming a seam joint with the mouth of the canister;

and a preformed elastomeric sealing ring located under axial and radial compression in a space defined by the internal surface of the canister mouth, the closing ring means and the end plate, said sealing ring thereby closing a leakage path past the radially outer periphery of the end plate to both the radially inner and outer peripheries of the closing ring.

* * * * *